US007137480B2

(12) United States Patent
Williams

(10) Patent No.: US 7,137,480 B2
(45) Date of Patent: Nov. 21, 2006

(54) HOLDING DEVICE FOR SECURING A WEAPON IN PLACE OF A TREE STAND

(76) Inventor: Richard Williams, 317 W. Park Ave., Greenwood, MS (US) 38930

( * ) Notice: Subject to any disclaimer, the term of this patent is extended or adjusted under 35 U.S.C. 154(b) by 0 days.

(21) Appl. No.: 10/837,681

(22) Filed: May 4, 2004

(65) Prior Publication Data
US 2005/0247522 A1 Nov. 10, 2005

(51) Int. Cl.
*A01M 31/00* (2006.01)
(52) U.S. Cl. .......................................... 182/187; 42/94
(58) Field of Classification Search ................ 182/188, 182/187, 135, 136; 42/94
See application file for complete search history.

(56) References Cited
U.S. PATENT DOCUMENTS

| 4,022,292 A | 5/1977 | Van Gompel | |
| 4,331,216 A | 5/1982 | Amacker | |
| 4,493,395 A | 1/1985 | Rittenhouse | |
| 4,759,963 A * | 7/1988 | Uso et al. | 428/100 |
| 5,414,949 A | 5/1995 | Peebles | |
| 5,593,121 A * | 1/1997 | Tackett | 248/218.4 |
| 5,758,808 A * | 6/1998 | Epps et al. | 224/257 |
| 6,345,690 B1 * | 2/2002 | Morris | 182/136 |
| 6,375,052 B1 | 4/2002 | Keton | |

* cited by examiner

*Primary Examiner*—Alvin Chin-Shue
(74) *Attorney, Agent, or Firm*—Ross F. Hunt, Jr.; Stites & Harbison PLLC

(57) ABSTRACT

A gun holder device is provided for releasably securing a long gun to a tree stand. The device includes a pair of elongate flexible elements made of webbing or the like which are secured together in a substantially cross shape configuration. The first element includes a loop portion at one end which mounts a pair of D-rings for securing the gun in place on the stand. The second element includes first and second hooks and loops fasteners at opposite ends on opposite sides for securing the device to the frame of the stand.

6 Claims, 1 Drawing Sheet

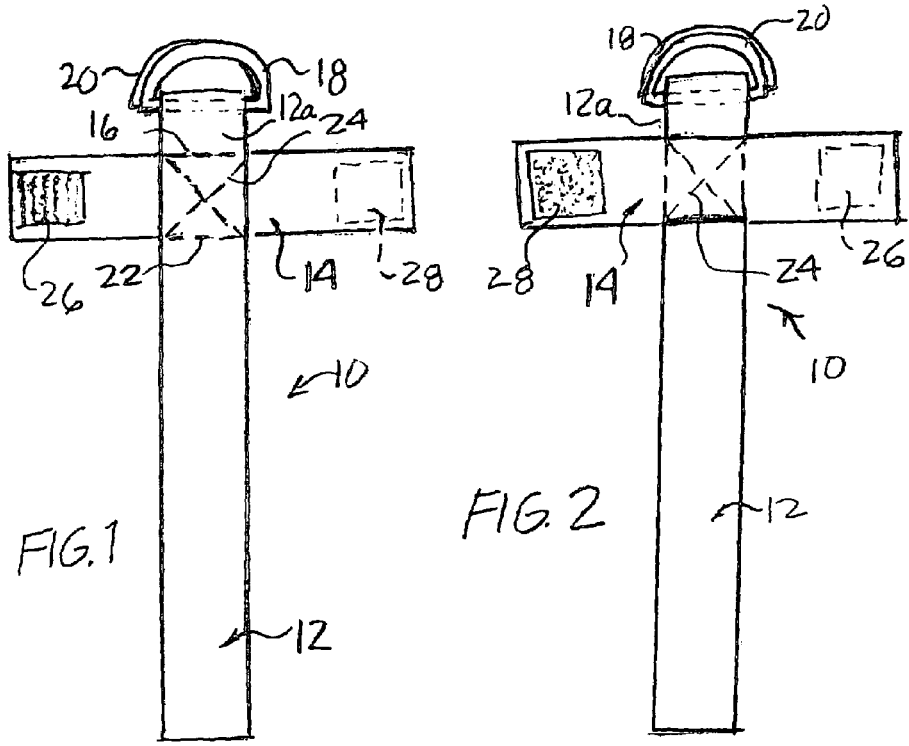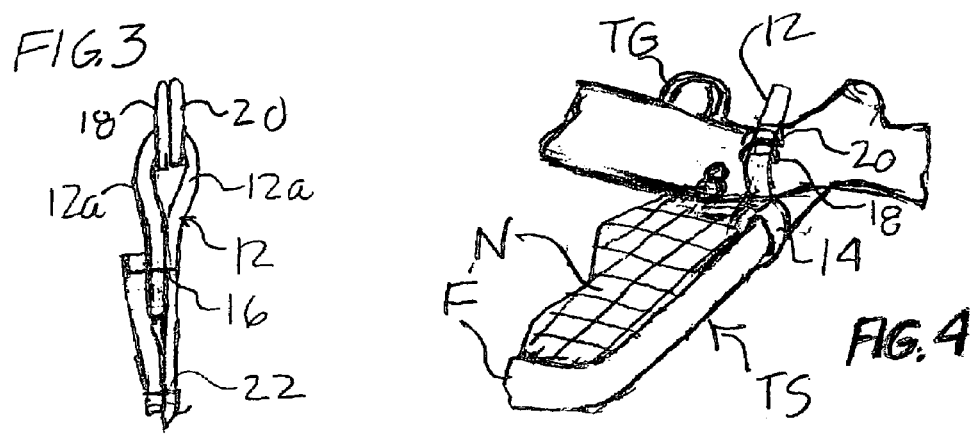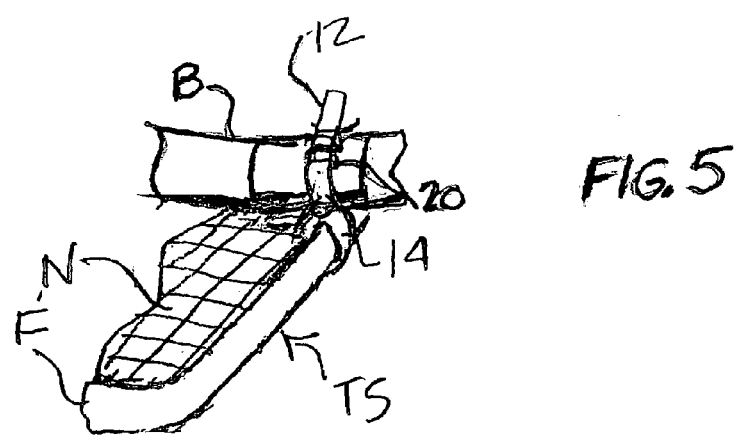

US 7,137,480 B2

HOLDING DEVICE FOR SECURING A WEAPON IN PLACE OF A TREE STAND

FIELD OF THE INVENTION

The present invention relates to tree stands and, more particularly, to a holding device for securing a weapon such as a long gun, i.e., a rifle or shotgun.

BACKGROUND OF THE INVENTION

A variety of tree stands, i.e., devices which are adapted to be mounted or supported in a tree and which include a seat or platform for a hunter, are commercially available. One problem with such tree stands is that they are relatively large and cumbersome and create a burden, particularly for a lone hunter, when the hunter also has to carry his gun along with the tree stand. As indicated below, some tree stands have been proposed which make provision for supporting a gun thereon but these proposals have not been completely successful, and there is a disadvantage with respect to versatility in having a permanently affixed gun holder. In the latter regard, most tree stands do not include a gun holder and it would be advantageous to have a simple gun holder that could be used with different tree stands at different times and locations.

U.S. Pat. No. 4,493,395 to Rittenhouse discloses a tree stand for hunters comprising frame, a plywood platform secured to the frame, a canvas seat attached to the frame, a safety belt secured to the frame, a block and tackle suspension unit attached to the frame, and a tree securement belt looped around the frame. A long gun support device in the form of a slidable clamp is permanently secured to the frame.

U.S. Pat. No. 4,331,216 to Amacker discloses an apparatus for climbing an upright columnar member such as a tree comprising a first climbing arrangement including a first gripping means for gripping the tree, first and second upper bars and third and fourth middle bars for supporting the body of the user, a first platform, spaced from the tree and movable along the third and fourth middle bars, for supporting the body of the user in a sitting position and a second climbing means for accommodating the feet of the user. A rack, permanently attached to the first climbing means by a nut and bolt, is provided for holding a gun or other weapon. The rack includes a resilient clip for retaining the gun.

U.S. Pat. No. 4,022,292 to Van Gompel discloses a portable tree stand including a platform, a pair of rollers mounted at an angle on one side of a tree and a roller locking claw disposed on the other side of the tree which locks the stand at the desired height. A ladder extends downwardly from the stand and allows the hunter to climb up to the stand, after which the ladder can be pulled upwardly to the stand to form a chair. The stand includes a gun holder arrangement which includes projections which are received in holes in the platform and which is formed by a pair of interconnected legs that are used in cradling a gun or in supporting a bow.

U.S. Pat. No. 6,375,052 to Keton discloses a weapon holding apparatus, including a pair of nylon straps adapted for holding, and readily releasing, a firearm or bow across a hunter's lap while the hunter is sitting on the ground or in a tree. Each nylon strap itself comprises a leg strap and a weapon retainer strap made of nylon webbing material attached together in a cruciform fashion. The ends of each strap have hooks and loops fastener material attached thereto. The leg strap is wrapped around the hunter's leg, while the weapon retainer strap is wrapped around the firearm or bow, with one strap being placed around each leg. The straps secure in place opposite ends of the firearm or bow, leaving the hunter's hands free while keeping the weapon readily accessible.

U.S. Pat. No. 5,414,949 to Peebles discloses an apparatus for supporting a firearm comprising a base, at least one hinged surface securement member attached to a bottom surface of the base, an extensible firearm support port in the base, an upright locking member removably placed within the extensible firearm support port, an extensible firearm support removably connected to the upright locking member, and a plurality of seating member ports located within the base. A releasable firearm securing apparatus (preferably a hooks and loops fastener) is permanently attached to a gun support cradle mounted on the firearm support.

SUMMARY OF THE INVENTION

In accordance with the invention, a gun holder device is provided for use in temporarily securing a gun to a tree stand so that the tree stand can be moved from place to place and/or installed in a tree with the gun secured thereto, thereby allowing the hands of a hunter (or other user of the tree stand) to be used in moving and manipulating the tree stand. The device is simple, rugged and effective and is very easy to use. The particular combination of holding means or mechanisms employed by the device enable a long gun or the like to be readily affixed or secured to a tree stand, to be firmly held in place and to be readily released when needed.

In accordance with one aspect of the invention, there is provided a holder device for releasably securing a long gun to a tree stand including a frame, said device comprising:

first and second elongate flexible elements extending substantially orthogonally to one another and secured together in a substantially cross shape configuration, the first element including a loop portion at one end thereof, and the second element including a first hooks and loops fastener member at one end thereof on one side thereof and a second hooks and loops fastener at the other end thereof, on the opposite side thereof for, when engaged with the first hooks and loops fastener, securing the device to the frame of the tree stand; and a pair of D-rings, affixed to said first element by said loop portion, for, with the other end of the first element threaded through the D-rings, securing the gun in place on the tree stand.

Preferably, the loop portion of the first element includes a free end secured by stitching to an intermediate portion of said first element and wherein said second element is secured by stitching to said first element so as to overlap the free end of said loop portion. Advantageously, the device further comprises diagonally crossing stitching joining said first and second elements together.

Preferably, the first element is of a substantially greater length than said first element.

In one advantageous embodiment, the first and second elements are made of a nylon webbing material.

According to a further aspect of the invention, there is provided, in combination, a climbing tree stand including a frame, a long gun for use in hunting from the tree stand, and a holding device separate from the gun and the tree stand for releasably securing the gun to the tree stand so that the operations of putting the tree stand into place in an operative position on a tree, and removing the tree stand from the tree, can be carried out with the gun secured to the tree stand, thereby freeing a hunter using the tree stand from holding the gun during said operations, the device comprising:

first and second elongate flexible elements extending substantially orthogonally to one another and secured together in a substantially cross shape configuration, the first element including a loop portion at one end thereof, and the second element including a first hooks and loops fastener member at one end thereof, on one side thereof, and a second hooks and loops fastener at the other end thereof on the opposite side thereof for, when engaged with the first hooks and loops fastener, securing the device to the frame of the tree stand; and a pair of D-rings, affixed to said first element by said loop portion, for, with the other end of the first element threaded through the D-rings, securing the gun in place on the tree stand.

As above, in a preferred embodiment, the loop portion of said first element includes a free end secured by stitching to an intermediate portion of said first element and said second element is secured by stitching to said first element so as to overlap the free end of said loop portion. Advantageously, the device further comprises diagonally crossing stitching joining said first and second elements together.

Also as above, the first element is of a substantially greater length than said first element so as to facilitate securing the gun in place with the D-rings.

Further features and advantages of the present invention will be set forth in, or apparent from, the detailed description of preferred embodiments thereof which follows.

BRIEF DESCRIPTION OF THE DRAWINGS

FIG. 1 is a top plan view of a holder device for releasably supporting a long gun such as a rifle, shotgun or the like on a tree stand, the device being constructed in accordance with a preferred embodiment of the invention;

FIG. 2 is a bottom plan view of the device of FIG. 1;

FIG. 3 is a side elevational view of a portion of the device of FIGS. 1 and 2, with portions omitted for purposes of clarity; and FIG. 4 is a schematic, partially broken away perspective view showing a gun holder device in accordance with a preferred embodiment of the invention in use in affixing or securing a long gun to a tree stand.

DESCRIPTION OF THE PREFERRED EMBODIMENTS

Referring to FIGS. 1 and 2, there are shown top and bottom plan views, respectively, of a gun holding device in accordance with a preferred embodiment of the invention, it being understood that the device, which is generally denoted 10, does not have "top" and "bottom" as such so that the labeling of the two views as has been done here is arbitrary. As illustrated, device 10 includes two strips or members 12 and 14 which are disposed in a T-shaped configuration or otherwise form a cross or a T. Strips 12 and 14 are made of a suitable material such as a fabric material and, in one advantageous embodiment, are made of a canvas or nylon webbing, although, in general, any relatively rugged, relatively flexible material can be used. Moreover, for ease of manufacture, strips 12 and 14 are preferably made of the same material.

In the preferred embodiment illustrated, strip 12 is substantially longer than strip 14 and, as shown in FIG. 3, includes a loop portion or loop 12*a* at one end thereof, i.e., at the top thereof as viewed in FIGS. 1 to 3. Loop portion 12*a* is formed by folding an end portion of strip 12 back on itself and sewing the free end to an intermediate portion (using stitching indicated at 16) so as to form a loop. A pair of identical D-rings 18 and 20 are captured within the loop portion 12*a*, as shown. As described below in connection with FIG. 4, in the use of device 10, the free end of strip 12 is inserted through D-rings 18 and 20 in a conventional manner to form a loop that can be adjusted in size, so that a rifle, shotgun or the like can be secured to and supported on a tree stand.

Although the showing in the drawings is not scale and the relationships shown in FIG. 3 are somewhat exaggerated, the above-mentioned stitching 16, and further stitching indicated at 22, are used to join strip 12 and 14 together. Cross stitching indicated at 24 in FIGS. 1 and 2 (but omitted in FIG. 3 for purposes of clarity of illustration) is also used to join strips 12 and 14 together in the embodiment under consideration. It will be appreciated that while this stitching is advantageous, other sewing or stitching patterns can be used, and that, moreover, strips 12 and 14 can be joined together or otherwise affixed to one another in other ways.

As shown in FIGS. 1 and 2 (but has been omitted in FIG. 3), cross strip 14 includes a first hooks and loops (e.g., VELCRO®) fastener 26 on one side thereof at one free end and a second hooks and loops fastener 28 on the other side thereof at the other free end. Fasteners 26 and 28 are adapted to be releasably affixed to one another so as to enable strip 24 to be fixed in place around a bar or frame member of a tree stand as is discussed below in connection with FIG. 4. It has been found that hooks and loops fasteners are particularly advantageous for the purpose because of the strong holding provided thereby in combination with the rapid release characteristics thereof.

Referring to FIG. 4, the device 10 is shown in use in securing a long gun G to a tree stand TS. Tree stand TS can be of basically any configuration and, as is conventional, typically includes a frame members F which form a portion thereof and strong netting N on which the hunter sits. As indicated above, the two ends of element 14 are wrapped around a frame member F and secured together by hooks and loops fasteners 26 and 28 (now shown in FIG. 4).

Element 12 is used to attach the long gun G to the tree stand TS and to this end, the long end of element 12 is disposed around a portion of long gun G below the trigger guard and threaded in a conventional manner through D-rings 18 and 20 so as to tighten down the loop formed thereby and snugly secure long gun G to frame F. It has been found that the use of a strap (corresponding to element 12) in combination with a pair of D-rings (corresponding to D-rings 18 and 20) enables a gun to readily and firmly be secured to a tree stand so that the gun and tree stand can be moved together, and the tree stand manipulated as needed. If desired, a second device 10 (not shown) can be used to secure the other, barrel end of long gun G to tree stand GS.

Although the invention has been described above in relation to preferred embodiments thereof, it will be understood by those skilled in the art that variations and modifications can be effected in these preferred embodiments without departing from the scope and spirit of the invention.

The invention claimed is:

1. In combination, a climbing tree stand including a peripheral frame, a weapon for use in hunting from the tree stand, and a holding device releasably securing the weapon to the tree stand so that the operations of putting the tree stand into place in an operative position on a tree, and removing the tree stand from the tree, can be carried out with the weapon secured to the tree stand, thereby freeing a hunter using the tree stand from holding the weapon during said operations, said device comprising:

first and second elongate flexible elements extending substantially orthogonally to one another and secured together in a substantially cross shape configuration, said first element is of a substantially greater length that said second element the first element including a loop portion at one end thereof, and the second element including a first hooks and loops fastener member at one end thereof, on one side thereof, and a second hooks and loops fastener at the other end thereof on the opposite side thereof the second elongate element wrapped around the frame and secured by the hooks and loops fasteners, securing the device to the frame of the tree stand; and a pair of D-rings, affixed to said first element by said loop portion, with the other end of the first element threaded through the D-rings, securing the weapon within the first element and in place on the tree stand.

2. A device as claimed in claim 1 wherein the loop portion of said first element includes a free end secured by stitching to an intermediate portion of said first element and said second element is secured by stitching to said first element so as to overlap the free end of said loop portion.

3. A device as claimed in claim 2 further comprising diagonally crossing stitching joining said first and second elements together.

4. A device as claimed in claim 1 wherein said first and second elements are made of a nylon webbing material.

5. A device as claimed in claim 1 wherein the weapon comprises a hunting bow.

6. A device as claimed in claim 1 wherein the weapon comprises a long gun.

* * * * *